United States Patent [19]

Bambauer et al.

[11] Patent Number: 5,382,289

[45] Date of Patent: Jan. 17, 1995

[54] INORGANIC FOUNDRY BINDER SYSTEMS AND THEIR USES

[75] Inventors: Ruth A. Bambauer; Heimo J. Langer, both of Columbus; Steven C. Akey, Dublin, all of Ohio

[73] Assignee: Ashland Oil, Inc., Columbus, Ohio

[21] Appl. No.: 123,507

[22] Filed: Sep. 17, 1993

[51] Int. Cl.$^6$ .................... C04B 9/04; C04B 35/04
[52] U.S. Cl. .................... 106/690; 106/691; 106/801; 106/38.3; 106/38.35; 501/111
[58] Field of Search ............ 106/690, 691, 801, 38.3, 106/38.35; 501/111

[56] References Cited

U.S. PATENT DOCUMENTS

| | | | |
|---|---|---|---|
| 3,923,525 | 12/1975 | Toeniskoetto et al. | 106/38.35 |
| 3,968,828 | 7/1976 | Toeniskoetter et al. | 164/41 |
| 4,089,692 | 5/1978 | Toeniskoetter et al. | 106/38.35 |
| 4,504,555 | 3/1985 | Prior et al. | 106/817 |
| 4,604,318 | 8/1986 | Prior et al. | 106/813 |
| 5,139,538 | 8/1992 | Morris et al. | 51/298 |
| 5,279,665 | 1/1994 | Yunovich et al. | 106/690 |

FOREIGN PATENT DOCUMENTS 4083302 3/1992 Japan.
4230612 8/1992 Japan.

OTHER PUBLICATIONS

Surface Structure of Zinc Phosphate Dental Cements, Louis Cartz, G. Servais and F. Rossi, Zinc Phosphates, J. Dent. Res., vol. 51, No. 6 (1972) pp. 1668–1671 no month.

The Solubility and Disintegration Test for Zinc Phosphate Dental Cements, A Chemical Study, A. D. Wilson, G. Abel and B. G. Lewis, Brit. Brit. Dent. J., 1974, 137313 no month.

Structure of Zinc Phosphate Dental Cement, G. E. Servais and L. Cartz, Zinc hosphates, J. Dent. Res., vol. 50, No. 3, pp. 613–610 (1971) no month.

*Primary Examiner*—Mark L. Bell
*Assistant Examiner*—Paul Marcantoni
*Attorney, Agent, or Firm*—David L. Hedden

[57] ABSTRACT

This invention relates to inorganic no-bake foundry binder systems and their uses. The binder systems comprise as separate components: (A) mono-aluminum phosphate in an aqueous solution containing specified phosphoric acids, and (B) magnesium oxide; and certain specified zinc compounds in either the Component A, Component B or both. The components of the binder system react when they are mixed with a foundry aggregate to prepare foundry mixes which are used to prepare foundry molds and cores. The foundry molds and cores are used to cast metals.

16 Claims, No Drawings

INORGANIC FOUNDRY BINDER SYSTEMS AND THEIR USES

TECHNICAL FIELD OF THE INVENTION

This invention relates to inorganic no-bake foundry binder systems and their uses. The binder systems comprise as separate components: (A) an acid phosphate in an aqueous solution containing specified phosphoric acids, and (B) magnesium oxide; and a compatible zinc compound which is part of either Component A, Component B, or both. The components of the binder system are mixed with a foundry aggregate to prepare foundry mixes which are used to prepare foundry molds and cores. The foundry molds and cores are used to cast metals.

BACKGROUND OF THE INVENTION

There is considerable interest in developing an inorganic foundry binder which has the performance characteristics of commercial organic foundry binders. Organic foundry binders, particularly those based upon polyurethane chemistry, have been used in the casting industry for several decades in both the no-bake and cold-box processes. This is because they produce foundry molds and cores with acceptable tensile strengths that shakeout of castings with relative ease. The castings prepared with these foundry molds and cores have a good surface finish with only minor defects.

Currently, the effects of organic foundry binders on the environment and health are under study. Consequently, there is an interest in considering alternative binders in case these studies are negative. Inorganic foundry binders are of particular interest because they are not subject to some of the concerns associated with organic foundry binders.

Various compositions of inorganic foundry binders are known. See for example U.S. Pat. No. 3,930,872 which describes an inorganic foundry binder comprising boronated aluminum phosphate and an oxygen-containing alkaline earth metal in specified amounts. Although these binders produce molds and cores that have adequate strength and shakeout easily from metal castings prepared with them, the binders exhibit high viscosity, are not very flowable and are not well suited for use with continuous mixers. Furthermore, molds and cores prepared with these binders do not exhibit adequate humidity resistance.

As another example of an inorganic foundry binder, see U.S. Pat. No. 4,111,705 which describes an inorganic no-bake foundry binder comprising orthophosphoric acid, a ferrous oxide containing material, and a water-soluble alkali metal or ammonium salt of certain carboxylic acids. U.S. Pat. No. 4,430,441, also describes a no-bake inorganic foundry binder comprising from 95-99 weight percent of a refractory filler containing magnesium oxides, iron oxides, silicon oxides or mixtures thereof and from 1 to 5 weight percent of an organic acid having a specified dissociation constant.

The binders disclosed in the latter two patents are not practical to use on a commercial scale. They do not produce foundry molds and cores with adequate strengths that easily shakeout of the castings prepared with them, and the castings produced are not substantially free of major defects. Furthermore, the work time and the strip time of the molds and cores produced with these binders are not acceptable from a commercial perspective.

SUMMARY OF THE INVENTION

This invention relates to inorganic foundry binder systems which comprise as separate components:
  A. an acid phosphate in an aqueous acid solution of a phosphoric acid selected from the group consisting of orthophosphoric acid, pyrophosphoric acid, trimetaphosphoric acid, tetrametaphosphoric acid, polyphosphoric acid, and mixtures thereof; and
  B. magnesium oxide; and
a compatible zinc compound which is part of either Component A, Component B, or both.

Preferably, the acid phosphate is mono-aluminum phosphate. The zinc compound is preferably mono-zinc phosphate if the zinc compound is used in Component A while zinc oxide is preferred if the zinc compound is used in Component B. If the mono-zinc phosphate is used in Component A, it can also act as the acid phosphate.

Preferably, the phosphoric acid is orthophosphoric acid and preferably the magnesium oxide is a refractory form of magnesium oxide, most preferably dead-burned magnesite. If the zinc compound is zinc oxide, and is part of Component B, then the magnesium oxide and zinc oxide are preferably heat treated as a powder blend.

The invention also relates to foundry binders prepared by mixing and reacting the separate components of the binder system, typically in the presence of a foundry aggregate to prepare foundry mixes. The foundry mixes are used to form foundry shapes, such as molds and cores, by a no-bake process. The foundry shapes are used to make metal castings.

The molds and cores prepared with these foundry binder systems have good surface characteristics with few casting defects. Additionally, the molds and cores readily shakeout of castings prepared with them. The sand mixture is flowable and can be compacted into cores and molds.

The work time of the foundry mix is generally less than 15 minutes, typically from 6-10 minutes. The strip time is less than 30 minutes, typically from 12-20 minutes. Foundry shapes made with the binder system typically exhibit 1 hour transverse disk strengths of 100-200 psi and 24 hour transverse strengths of 300-400 psi.

The foundry mixes and foundry shapes also exhibit improved humidity resistance compared to typical systems. Initial casting results indicate good hot strengths with little penetration, veining to a small extent, and good shakeout. Furthermore, the use of these binder systems is not likely to have a negative impact on human health and the environment.

BEST MODE AND ENABLING DISCLOSURE

For purposes of this disclosure, a foundry binder system comprises the separate components of the foundry binder, namely Component A and Component B. The foundry binder is the reaction product which results from mixing Component A with Component B, typically in the presence of a foundry aggregate. The foundry mix is the mixture of the foundry binder and aggregate, usually sand. Foundry shapes are typically made by shaping the foundry mix into a mold or core. Although the foundry binder is predominately inorganic, it may be desirable to add certain organic materials to the binder system as well as other additives.

Component A of the foundry binder system is a liquid which comprises an acid phosphate in an aqueous solution of a phosphoric acid selected from the group consisting of orthophosphoric acid, pyrophosphoric acid, trimetaphosphoric acid, tetrametaphosphoric acid, polyphosphoric acid, and mixtures thereof. The concentration of the phosphoric acid in the aqueous solution is typically from 30 to 50 weight percent of the solution, preferably 35 to 45 weight percent. The concentration of the phosphoric acid solution in Component A typically ranges from 40 to 75 weight percent based upon the total weight of Component A, preferably from 50 to 60 weight percent.

An acid phosphate is a mono-substituted phosphate. Examples of acid phosphates use in Component A include mono-aluminum phosphate, mono-zinc phosphate, mono-ammonium phosphate, mono-magnesium phosphate, mono-calcium phosphate, and mono-sodium phosphate. Mono-aluminum phosphate is preferably used as the acid phosphate in Component A.

The amount of acid phosphate used in Component A will depend upon whether there is any mono-zinc phosphate in Component A, whether there is any zinc oxide in Component B, and how much of these zinc compounds are present. Typically the amount of acid phosphate, preferably mono-aluminum phosphate in Component A, is from 25 to 55 weight percent based upon the total weight of Component A, preferably from 40 to 50 weight percent.

It is believed that the acid phosphate can be added to the phosphoric acid directly. However, it is preferable to form the acid phosphate in the phosphoric acid solution by adding an acid phosphate precursor (for instance by adding aluminum or aluminum oxide). The amount of acid phosphate precursor added to the phosphoric acid is determined stoichiometrically to provide the desired weight percent of mono-aluminum phosphate from 25 and 55 weight percent in phosphoric acid solution.

The addition of the mono-aluminum phosphate precursor can be made at room temperatures, but the solution of precursor and phosphoric acid must be heated to produce the desired chemical reaction forming mono-aluminum phosphate. Temperatures between 50° C. and 120° C. are required to produce mono-aluminum phosphate.

If mono-zinc phosphate is used alone or in addition to another acid phosphate in Component A, it is believed that the mono-zinc phosphate can also be added to the phosphoric acid directly. However, it is preferable to form the mono-zinc phosphate in the phosphoric solution by adding a zinc compound to the phosphoric acid solution which does not result in the formation of a by-product which remains in the acid phosphate/phosphoric acid solution. Examples of such compounds include zinc phosphate, zinc carbonate, zinc hydroxide, preferably zinc or zinc oxide, and most preferably zinc oxide. The addition of mono-zinc phosphate precursor should be made at temperatures between 90° C. and 110° C., preferably 100° C. When both mono-zinc phosphate and mono-aluminum phosphate are formed by precursor addition to phosphoric acid, the mono-zinc phosphate precursor should be added to the acid first at temperatures between 90° C. and 110° C., preferably 100° C., and allowed to react. Following the mono-zinc phosphate formation, the solution should be cooled to temperatures between 25° C. and 70° C. before addition of the mono-aluminum phosphate precursor. The addition of the mono-zinc phosphate precursor should be made at temperatures of about 90° C. to 110° C., preferably 100° C.

Stoichiometric amount refers to the molar ratio of Al or Zn in the precursor to phosphoric acid. For instance, in the case of aluminum precursors, one mole of Al metal reacts with 3 moles of phosphoric acid to form one mole of $Al(H_2PO_4)_3$ (mono-aluminum phosphate) plus 1.5 moles $H_2$ gas. If $Al_2O_3$ (aluminum oxide) is used, 1 mole of $Al_2O_3$ reacts with 6 moles of phosphoric acid to give 2 moles of $Al(H_2PO_4)_3$ plus 3 moles $H_2O$.

In the case of zinc precursors, one mole of zinc metal reacts with 2 moles of phosphoric acid to give 1 mole $Zn(H_2PO_4)_2$ (mono-zinc phosphate) plus 1 mole $H_2$ gas. If ZnO is used as the mono-zinc phosphate precursor, 1 mole of ZnO reacts with 2 moles of phosphoric acid to give 1 mole $Zn(H_2PO_4)_2$ plus 1 mole of $H_2O$.

The viscosity of Component A is preferably under 400 cps at 25° C., most preferably from 100 to 300 cps.

If Component A does not contain any mono-zinc phosphate, then Component B must be comprised of a mixture of (1) magnesium oxide and (2) most preferably zinc oxide, or presumably any other zinc compound which thermally decomposes upon heating to give zinc oxide such as, for example, zinc acetate or zinc carbonate. It should be noted that the mixture of zinc oxide and magnesium oxide can also be used as Component B even when Component A contains up to about 12 weight percent mono-zinc phosphate.

The magnesium oxide used in the Component B is preferably a refractory form of magnesium oxide, such as dead-burned periclase, most preferably dead-burned magnesite. The weight ratio of magnesium oxide to zinc oxide in the Component B is from 1:9 to 9:1, preferably from 9:1 to 6:4. The magnesium oxide and the blends of magnesium oxide and zinc oxide are treated by heating the magnesium oxide or mixtures of magnesium oxide and zinc oxide at temperatures between 1050° C. and 1500° C., preferably 1250° C. and 1350° C. to reduce surface area and thereby reduce reactivity with the liquid component.

The amount of zinc used in the binder will depend upon whether the zinc compound is used in Component A, Component B, or both, and the weight ratio of Component A to Component B. Typically the amount of zinc (which is usually in the form of a zinc acid phosphate if present in the Component A or zinc oxide if present in the Component B) in the binder system, where the weight ratio of Component A to Component B is 1:1, is from 0.5 to 25 weight percent, preferably 1.0 to 20.0 weight percent, and most preferably 1.5 to 10.0 weight percent, said weight percent being based upon the total weight of Component A and Component B.

The weight ratio of the Component A to the Component B is generally from 3:1 to 1:3, preferably from 3:2 to 2:3. Generally, an effective binding amount of binder system is such that the weight ratio of foundry binder system (which includes Component A and Component B) to aggregate is from 1:100 to 10:100, preferably 2:100 to 8:100.

The combination of the binder components provides a binder which has appropriate work time, strip time, immediate and long term transverse strengths, effective shakeout, and castings free of defects. It also gives the user significant flexibility to customize a binder appropriate for his needs which is not likely to have a negative impact on human health and the environment.

Foundry mixes are prepared from the foundry systems by mixing the foundry binder system with a foundry aggregate in an effective binding amount. Either the Component A or Component B can be first mixed with the aggregate. It is preferred to mix the Component A of the foundry binder system with the foundry aggregate before adding the Component B.

Although the subject binders are preferably and predominately inorganic, optional components, including organic additives, may be added to the binder, such as polyvinyl alcohol, polyacrylic acid, polyacrylamide, urea, cellulose, citric acid, rubber lattices, and Nylon; and inorganic additives such as potassium phosphate, chromite and cement. Those skilled in the art of formulating inorganic foundry binders will know what substances to select for various properties and they will know how much to use of these substances and whether they are best incorporated into the Component A, Component B, or mixed with the aggregate as a separate component. Obviously, it may be necessary to adjust the ratios set forth previously related to the amounts of components if optional materials are added to the binder formulation.

EXAMPLES

The examples will illustrate specific embodiments of the invention. These examples along with the written description will enable one skilled in the art to make and use the invention. It is contemplated that many equivalent embodiments of the invention will be operable besides these specifically disclosed.

In the examples, the foundry molds are prepared by the no-bake process made by mixing Wedron 540 sand with the components of the binder system. Component A of the binder system used in the examples consisted of mono-aluminum phosphate (MAP) [in some cases mixtures of MAP with mono-zinc phosphate (MZP)] in an aqueous solution of orthophosphoric acid (OA) at 40% concentration. Component B consisted of a mixture of dead-burned magnesium oxide (MO), and some cases mixtures of MO with zinc oxide (ZO). The MO and the mixtures of MO and ZO were treated at 1350° C.

The Component A and sand were first mixed in a Hobart stainless steel mixer for several minutes until thoroughly mixed. Then the Component B was added to the sand/Component A mixture and mixed for one minute until both Component A and Component B were mixed thoroughly with the sand. The work time (WT) and strip time (ST) for the foundry mixes are given in Table I.

Transverse strengths of cores made with the binders are also shown in Table I. Measuring the transverse strength of the test samples enables one to predict how the mixture of aggregate and binder will work in actual foundry operations. In order to measure transverse strengths, transverse disk (50 mm diameter×12 mm height) strength samples were formed by hand ramming the sand binder mixture into two 12-specimen core boxes. Then the transverse strengths were measured using a +GF+ Universal Strength Machine Model PFG 1 hour, 3 hours and 24 hours after curing at ambient conditions. The humidity resistance was tested by placing samples which had cured for 24 hours into a humidity chamber at 25° C. and 99% relative humidity (RH).

The abbreviations used in the examples are the following:

OA=orthophosphoric acid
MAP=mono-aluminum phosphate
MZP=mono-zinc phosphate
MO=magnesium oxide
ZO=zinc oxide

Examples 1-3

Examples 1-3 illustrate the effect of placing the zinc compound in either the Component A, Component B, or both components. A mixture containing Wedron 540 silica sand, 3.5% B.O.S. of liquid Component A, and 3.5% B.O.S. of powder Component B, was prepared as previously described.

In Example 1, the zinc compound was in the Component A as MZP. Component A contained 49.2% weight percent OA at 40% concentration weight, 39.7 weight percent MAP, and 11.1% MZP, all weight percents based upon the total weight of the Component A. The Component B contained MO heated at 1350° C. for three hours, but did not contain a zinc compound. The MO was ground using a mortar and pestle and sieved to less that 170 mesh to reduce particle size.

The Component A liquid was first added to the Wedron 540 sand in a stainless steel mixing bowl and mixed for a total of 1.5 minutes using a paddle style mixer. The powdered Component B hardener was added second and mixed for a total of one minute.

In Example 2, there was no zinc compound used in the Component A. Instead the zinc compound (ZO) was used in the Component B with MO as a heat treated blend prepared by heating the ZO and MO at 1350° C. for three hours. The weight ratio of ZO to MO in the blend was 10:90. The amount of OA (at 40 percent concentration) used in Component A was 56 weight percent and the amount MAP used was 44 weight percent.

In Example 3, there was a zinc compound in both the Component A and Component B. The Component A of Example 3 was the same as in Example 1 and the Component B was the same as in Example 2. The Component B contained ZO and MO in a weight ratio of 10:90.

The results of Examples 1-3 are summarized in Table I. Each Component A in the Examples contained orthophosphoric acid (OA) which is not listed in Table I. The following abbreviations are used in the Table:

EX=Example
CMP=Component
RH=Relative humidity
ST=Strip time
WT=Work time

TABLE I

| EX # | CMP A | CMP B | WT/ST | TRANSVERSE STRENGTH (PSI) | | | |
|---|---|---|---|---|---|---|---|
| | | | | 1 HR | 3 HR | 24 HR | 24 + 1 99% RH |
| 1 | MAP MZP | MO | 9.5/21 | 116 | 352 | 350 | 121 |
| 2 | MAP | MO ZO | 7/16 | 234 | 338 | 323 | 110 |
| 3 | MAP MZP | MO ZO | 7/17 | 103 | 393 | 362 | 66 |

The data in TABLE I indicate that it is preferred to use the zinc compound in Component A or Component B rather than both.

The data in Table I indicate that it is preferred to use the zinc compound in Component A or Component B rather than both.

We claim:

1. An inorganic foundry binder system which comprises as separate components:
   A. an acid phosphate in an aqueous acid solution of a phosphoric acid selected from the group consisting of orthophosphoric acid, pyrophosphoric acid, trimetaphosphoric acid, tetrametaphosphoric acid, polyphosphoric acid, and mixtures thereof, and
   B. magnesium oxide; and
   wherein a zinc compound, which will act as a mono zinc phosphate precursor, is part of either Component A, Component B, or both, such that the amount of zinc in said binder system is from 0.5 to 25 weight percent, said weight percent being based upon the total weight of Component A and Component B, and such that the weight ratio of the Component A to Component B is from 3:1 to 1:3.

2. The binder system of claim 1 wherein the magnesium oxide is dead-burned magnesium oxide and the acid phosphate is mono-aluminum phosphate.

3. The binder system of claim 2 wherein the phosphoric acid of the Component A is orthophosphoric acid.

4. The binder system of claim 3 wherein the aqueous solution of orthophosphoric acid is from 30 weight percent to 50 weight percent of orthophosphoric acid, said weight based upon the total weight of the acid and water in the aqueous solution.

5. The binder system of 4 wherein the amount of mon-aluminum phosphate is from 25 to 55 weight percent based upon the total weight of Component A.

6. The binder system of claim 5 wherein the amount of zinc compound in the binder system is from 1.5 to 10 weight percent, said weight percent being based upon the total weight of Component A and Component B.

7. The binder system of claim 6 wherein the weight ratio of the Component A to Component B is about 1:1.

8. The binder system of claim 7 wherein zinc oxide is used in Component B as the zinc compound as a heat treated blend with the magnesium oxide, whereby said blend is heat treated at a temperature of from 1250° C. to 1350° C., and whereby the weight ratio of zinc oxide to magnesium oxide in Component B is from 9:1 to 1:9.

9. The binder system of claim 8 which contains an organic additive.

10. A foundry mix comprising in admixture:
    (1) a foundry aggregate; and
    (2) an effective amount of a foundry binder system
    A. an acid phosphate in an aqueous acid solution of a phosphoric acid selected from the group consisting of orthophosphoric acid, pyrophosphoric acid, trimetaphosphoric acid, tetrametaphosphoric acid, polyphosphoric acid, and mixtures thereof, and
    B. magnesium oxide; and
    wherein a zinc compound, which will act as a mono zinc phosphate precursor, is part of either Component A, Component B, or both, such that the amount of zinc in said binder system is from 0.5 to 25 weight percent, said weight percent being based upon the total weight of Component A and Component B, and such that the weight ratio of the Component A to Component B is from 3:1 to 1:3.

11. The foundry mix of claim 10 wherein the magnesium oxide is dead-burned magnesium oxide and the acid phosphate is mono-aluminum phosphate.

12. The foundry mix of claim 11 wherein the phosphoric acid of the Component A is orthophosphoric acid.

13. The foundry mix of claim 12 wherein the aqueous solution of orthophosphoric acid is from 30 weight percent to 50 weight percent of orthophosphoric acid, said weight based upon the total weight of the acid and water in the aqueous solution.

14. The foundry mix of 13 wherein the amount of mon-aluminum phosphate is from 25 to 55 weight percent based upon the total weight of Component A.

15. The foundry mix of claim 5 wherein the amount of zinc compound in the binder system is from 1.5 to 10 weight percent, said weight percent being based upon the total weight of Component A and Component B.

16. The foundry mix of claim 15 wherein the weight ratio of the Component A to Component B is about 1:1.

* * * * *